US006466166B2

United States Patent
Nakagawa

(10) Patent No.: US 6,466,166 B2
(45) Date of Patent: Oct. 15, 2002

(54) MULTI-BEAM RECEIVING APPARATUS

(75) Inventor: Takashi Nakagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/867,635

(22) Filed: May 31, 2001

(65) Prior Publication Data

US 2001/0048389 A1 Dec. 6, 2001

(30) Foreign Application Priority Data

Jun. 2, 2000 (JP) ........................................ 2000-166036

(51) Int. Cl.[7] ................................................ G01S 3/16
(52) U.S. Cl. ......................................... 342/378; 455/65
(58) Field of Search ............................ 342/378; 455/65, 455/562

(56) References Cited

U.S. PATENT DOCUMENTS

| | | | | |
|---|---|---|---|---|
| 6,064,338 A | * | 5/2000 | Kobayakawa et al. | ...... 342/378 |
| 6,249,251 B1 | * | 6/2001 | Chang et al. | ............... 342/378 |
| 6,320,899 B1 | * | 11/2001 | Chang et al. | ............... 375/147 |
| 2001/0049295 A1 | * | 12/2001 | Matsuoka et al. | .......... 455/562 |

* cited by examiner

Primary Examiner—Gregory C. Issing
(74) Attorney, Agent, or Firm—Sughrue Mion, PLLC

(57) ABSTRACT

In a multi-beam receiving apparatus, radio receiving sections receive radio signals through antenna elements. Correlators calculate code correlation values of desired wave signals contained in reception signals output from the radio receiving sections. Each first beam formation device forms a beam on the basis of all outputs from the correlators. Delay profile estimation sections individually generate delay profiles on the basis of the outputs from the first beam formation devices. A detector detects, on the basis of the outputs from the delay profile estimation sections, a reception timing of a multipath formed from the beams. Demodulators demodulate all the reception signals output from the radio receiving sections at the detected reception timing. Each second beam formation device forms a beam on the basis of all demodulation outputs from the demodulator. A synthesizer synthesizes the outputs from the second beam formation devices after weighting. A beam weight control section weights, by a beam weight, the output from each correlator for each first beam formation device and weights, by a beam weight, the output from each demodulator for each second beam formation device.

10 Claims, 5 Drawing Sheets

MULTI-BEAM RECEIVING APPARATUS

BACKGROUND OF THE INVENTION

The present invention relates to a base station in a mobile communication system using a direct spread CDMA (Code Division Multiple Access) and, more particularly, to a multi-beam receiving apparatus in the base station, which receives a radio signal from a mobile station.

FIG. 7 shows a sector receiving apparatus for receiving a radio signal corresponding to one user in the base station of a CDMA mobile communication system using a conventional sector antenna. Referring to FIG. 7, to receive a radio signal of one sector corresponding to one user, normally, diversity reception using two antennas $501_1$ and $501_2$ is performed. Signals received by the antennas $501_1$ and $501_2$ are frequency-converted into intermediate frequencies by radio receiving sections $502_1$ and $502_2$, respectively, and then, subjected to automatic gain amplification. The amplified reception signals are further detected to the baseband signals of I/Q channels by the radio receiving sections $502_1$ and $502_2$ using quadrature detection and then converted into digital signals by an A/D converter. The outputs from the radio receiving sections $502_1$ and $502_2$ are sent to a searcher section 500 and finger section 510.

In the searcher section 500, the code correlation values of desired wave signals contained in the reception signals are calculated by correlators $503_1$ and $503_2$, and delay profiles are generated by delay profile estimation sections $504_1$ and $504_2$ on the basis of the calculation results. A path detection circuit 505 detects the reception timings of the multipath signals from the generated delay profiles (the maximum number of detected paths equals the number of demodulators 511 in the finger section 510) and notifies the finger section 510 of the detected reception timings as a reception timing notification signal E.

The finger section 510 despreads the signals from the radio receiving sections $502_1$ and $502_2$ using the reception timing notification signal E and antenna number notification signal F output from the path detection circuit 505. That is, an antenna is selected in accordance with the antenna number notification signal F, and each path is despread at a timing notified by the reception timing notification signal E. The despread signals are synthesized by a maximum ratio synthesizer 512 and sent to a decoding circuit 520.

As the antennas $501_1$ and $501_2$, sector antennas shown in FIG. 8 are used. A sector antenna is dedicated to one of a plurality of sectors obtained by dividing the periphery (cell) of 360°. When a cell is divided into sectors, any interference waves that arrive from mobile stations outside a sector can be removed, and interference with the mobile stations outside the sector can be reduced.

However, when the cell is divided into a plurality of sectors, an arriving wave from a mobile station 602 of a certain user in a single sector becomes an interference wave for the desired wave of another mobile station 601, as shown in FIG. 8. Such an interference wave decreases the radio channel capacity and also degrades the transmission quality.

For this reason, when the number of sectors is increased in order to improve the quality and increase the capacity of such a mobile communication system, the number of times of hand-over between the sectors increases along with the increase in number of sectors. This decreases the radio channel capacity. Additionally, since the increase in the number of sectors directly results in an increase in the number of antennas or receivers, the scale and cost of the system increase.

SUMMARY OF THE INVENTION

It is an object of the present invention to provide a multi-beam receiving apparatus which allows a high quality and large capacity in a mobile communication system without decreasing the radio channel capacity or increasing the scale and cost.

In order to achieve the above object, according to the present invention, there is provided a multi-beam receiving apparatus comprising a plurality of antenna elements, a plurality of radio receiving means for receiving radio signals through the antenna elements, respectively, a plurality of correlation means for calculating code correlation values of desired wave signals contained in reception signals output from the radio receiving means, a plurality of first beam formation means for individually forming beams on the basis of all outputs from the correlation means, a plurality of delay profile means for individually generating delay profiles on the basis of outputs from the first beam formation means, detection means for detecting, on the basis of outputs from the delay profile means, a reception timing of a multipath formed from the beams formed by the first beam formation means, a plurality of demodulation means for demodulating all the reception signals output from the radio receiving means at the reception timing detected by the detection means, a plurality of second beam formation means for individually forming beams on the basis of all demodulation outputs from the demodulation means, synthesis means for synthesizing outputs from the second beam formation means after weighting, and beam weight control means for weighting, by a beam weight, each output from the correlation means for each of the first beam formation means and weighting, by a beam weight, each output from the demodulation means for each of the second beam formation means.

DESCRIPTION OF THE PREFERRED EMBODIMENTS

The present invention will be described below in detail with reference to the accompanying drawings.

Figure 1:
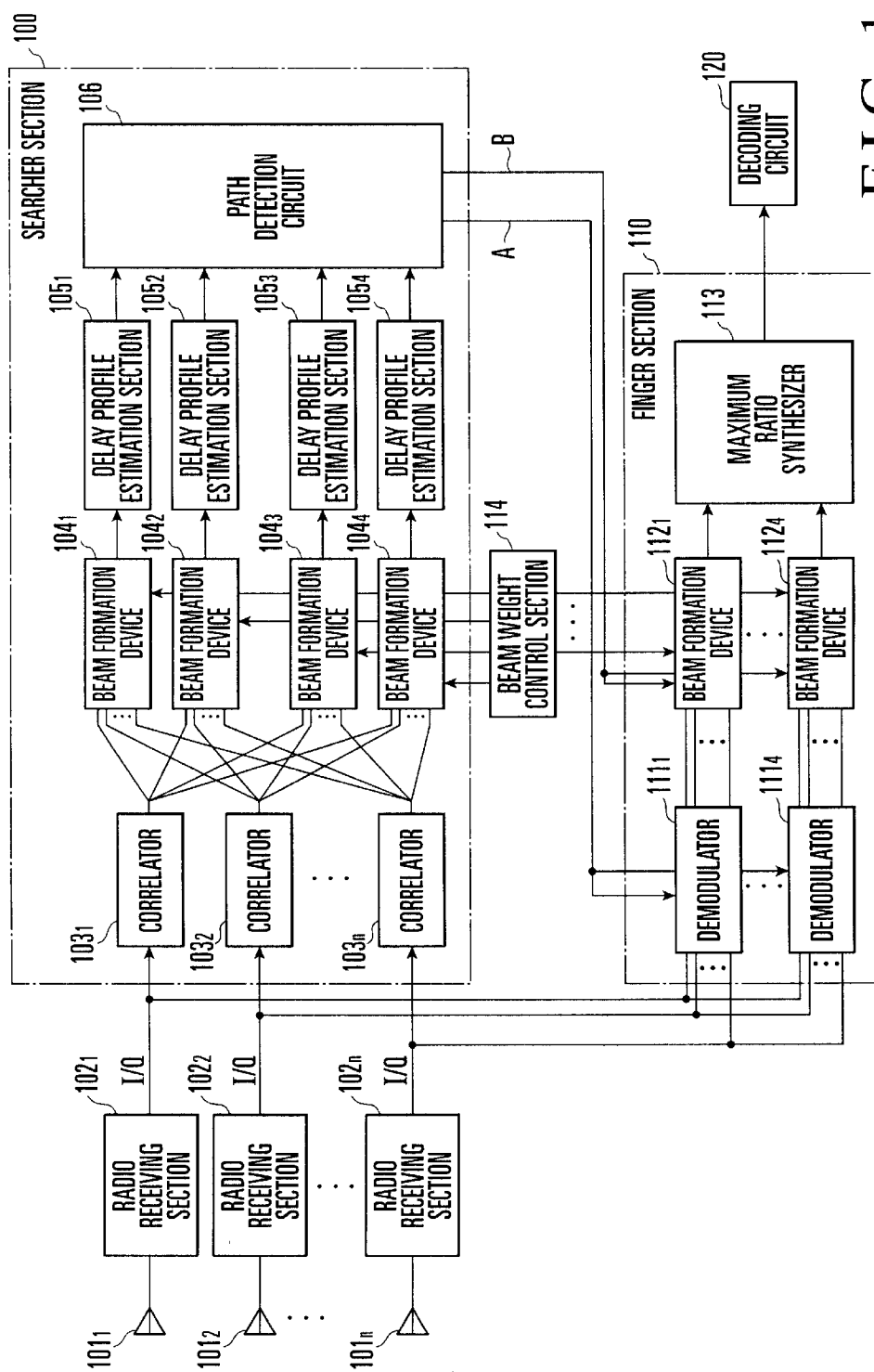
FIG. 1 is a block diagram of a multi-beam receiving apparatus according to the first embodiment of the present invention.

FIG. 1 shows a multi-beam receiving apparatus according to the first embodiment of the present invention. The multi-beam receiving apparatus of this embodiment is the receiving apparatus of a mobile communication system using the direct spread CDMA scheme and implements a multi-beam system which forms a plurality of beams using an array antenna having a plurality of antenna elements.

FIG. 1 shows the receiving apparatus of a fixed multi-beam system for generating four beams. The multi-beam receiving apparatus of this embodiment comprises n antenna elements $101_1$ to $101_n$, radio receiving sections $102_1$ to $102_n$ for converting RF (Radio Frequency) signals received by the antenna elements $101_1$ to $101_n$ into digital baseband signals, a searcher section 100 for detecting the position (timing) of a path for each beam, a finger section 110 for performing despreading at the timing detected by the searcher section 100 and then performing maximum ratio synthesis, and a beam weight control section 114 for setting a predetermined beam weight (complex weight) for each signal.

The searcher section 100 comprises n correlators $103_1$ to $103_n$ for receiving the outputs from the radio receiving sections $102_1$ to $102_n$, respectively, beam formation devices $104_1$ to $104_4$ arranged in number equal to that of beams (four beams) to be generated, delay profile estimation sections $105_1$ to $105_4$ for receiving the outputs from the beam formation devices $104_1$ to $104_4$, respectively, and a path detection circuit 106 for receiving the outputs from the delay profile estimation sections $105_1$ to $105_4$ and outputting a reception timing notification signal A and beam number notification signal B to the finger section 110.

The finger section 110 comprises demodulators $111_1$ to $111_4$ which are provided in number equal to that of beams and commonly receive all the outputs from the radio receiving sections $102_1$ to $102_n$, beam formation devices $112_1$ to $112_4$ for receiving the outputs from the demodulators $111_1$ to $111_4$, and a maximum ratio synthesizer 113 for receiving the outputs from the beam formation devices $112_1$ to $112_4$ and outputting a maximum ratio synthesis signal to a decoding circuit 120. The reception timing notification signal A and beam number notification signal B are input to the demodulators $111_1$ to $111_4$ and beam formation devices $112_1$ to $112_4$.

Figure 7:
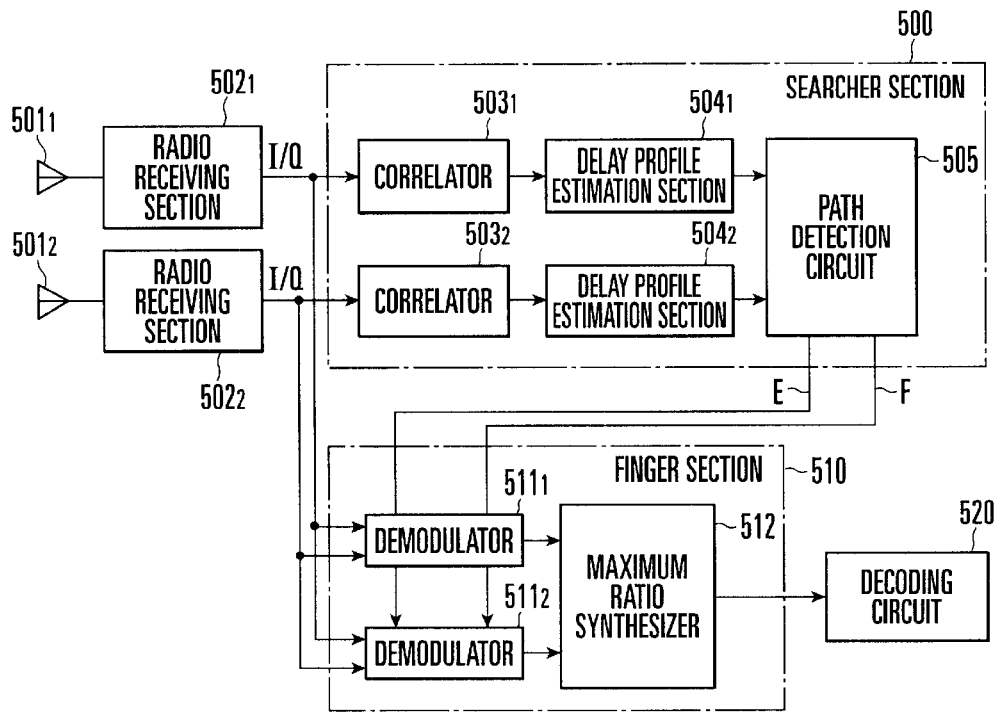
FIG. 7 is a block diagram of a conventional multi-beam receiving apparatus.
Figure 8:
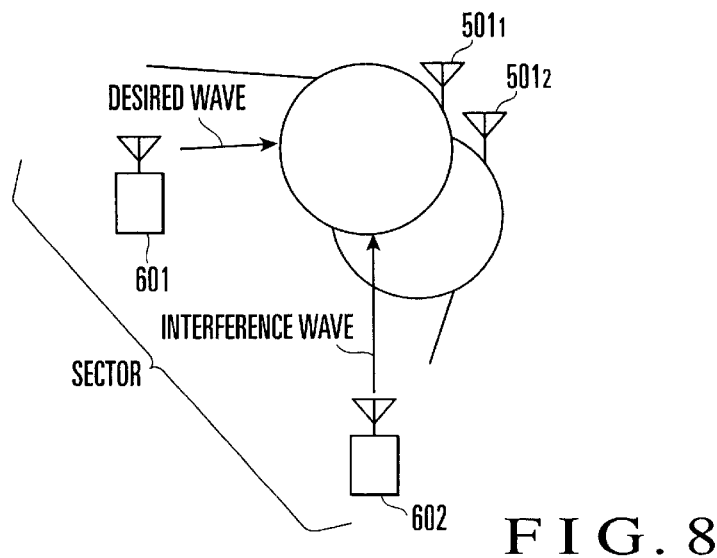
FIG. 8 is a view showing the beam reception situation in the conventional multi-beam receiving apparatus.

As described above, in this embodiment, the beam formation devices $104_1$ to $104_4$ and $112_1$ to $112_4$ are added to the searcher section and finger section of the conventional receiving apparatus shown in FIG. 7, and the beam weight control section 114 for setting a beam weight for each beam formation device is commonly provided for the beam formation devices $104_1$ to $104_4$ of the searcher section 100 and the beam formation devices $112_1$ to $112_4$ of the finger section 110.

The beam formation devices $104_1$ to $104_4$ of the searcher section 100 are provided in number equal to that of beams to be generated, and each of the beam formation devices $104_1$ to $104_4$ receives the correlation values of input signals from all the antenna elements $101_1$ to $101_n$. The beam formation devices $112_1$ to $112_4$ of the finger section 110 are provided in number equal to that of demodulators $111_1$ to $111_4$, and the outputs from the demodulators $111_1$ to $111_4$ are input to the beam formation devices $112_1$ to $112_4$, respectively. Each beam formation devices $104_1$ to $104_4$ and $112_1$ to $112_4$ generates a beam by multiplying the input I/Q correlation value by a beam weight set by the beam weight control section 114.

Figure 2:
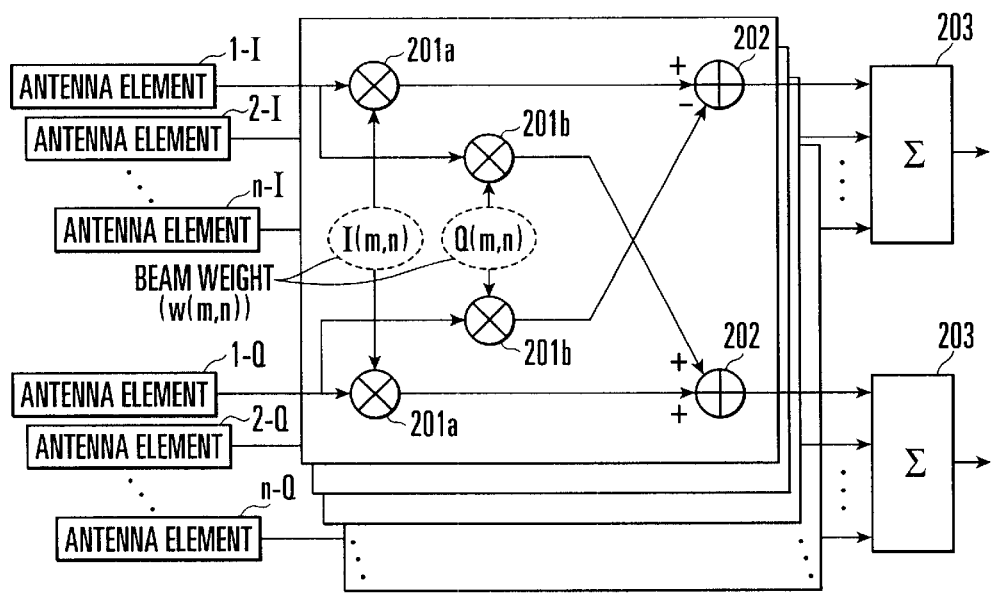
FIG. 2 is a block diagram of a beam formation device shown in FIG. 1.

FIG. 2 shows the arrangement of each of the beam formation devices $104_1$ to $104_4$ and $112_1$ to $112_4$ included in the searcher section 100 and finger section 110. Each beam formation device comprises (4×n) multipliers 201a and 201b, (2×n) adders 202, and two accumulators 203 for adding and synthesizing n I/Q outputs in order to calculate a complex product sum for the n antenna elements.

The operation of the multi-beam receiving apparatus having the above arrangement will be described next.

RF signals received by the antenna elements $101_1$ to $101_n$ are sent to the corresponding radio receiving sections $102_1$ to $102_n$, respectively. In each of the radio receiving sections $102_1$ to $102_n$, the received RF signal is frequency-converted into an intermediate frequency by a frequency conversion section 11 and the intermediate frequency signal is amplified by an automatic gain amplifier 12. The signal is detected to the baseband signal of an I/Q channel by an orthogonal detector 13 using quadrature detection, converted into a digital signal by an A/D converter 14, and output.

The outputs from the radio receiving sections $102_1$ to $102_n$ are sent to the searcher section 100 and finger section 110. Upon receiving the output signals from the radio receiving sections $102_1$ to $102_n$, the correlators $103_1$ to $103_n$ of the searcher section 100 calculate the code correlation values of desired wave signals contained in the reception signals and output the code correlation values. The n outputs from the correlators $103_1$ to $103_n$ are commonly sent to the beam formation devices $104_1$ to $104_4$. In the beam formation devices $104_1$ to $104_4$, the values are weighted by beam weight. The beam weight for each of the beam formation devices $104_1$ to $104_4$ is preset by the beam weight control section 114.

FIG. 2 shows details of each of the beam formation devices $104_1$ to $104_4$ of the searcher section. Referring to FIG. 2, each of the beam formation devices $104_1$ to $104_4$ comprises a pair of first multipliers 201a for multiplying the I/Q signal input for each antenna by a beam weight I(m,n), a pair of second multipliers 201b for multiplying the I/Q signal input for each antenna by a beam weight Q(m,n), a pair of adders 202 for adding the I/Q outputs from the first multipliers 201a and the Q/I outputs from the second multipliers 201b, and a pair of accumulators 203 for adding and synthesizing the I/Q outputs from the adders 202 for the respective antenna elements.

In each of the beam formation devices 104 to $104_1$ having the above arrangement, arithmetic operations are performed using the multipliers 201a and 201b and the adders 202 between a beam weight w(m,n) including the beam weights I/Q(m,n) and the code correlation values of the desired wave signals (I/Q) received by the antenna elements $101_1$ to $101_n$ and calculated for the correlators $103_1$ to $103_n$. The obtained calculation results for the antenna elements $101_1$ to $101_n$ are output to the accumulators 203 and added and synthesized.

The beam weight w(m,n) is given by $$w(m,n)=\exp\{j\times 2\pi(m-1)(n-1)/s+j\pi(n-1)/t\} \quad (1)$$

where m is the beam number (number of beam formation device), n is the antenna element number, s is the number of beams, and t is the number of antenna elements.

For example, when four beams are to be generated using four antenna elements, equation (1) can be rewritten to $$w(m,n)=\exp\{j\times 2\pi(m-1)(n-1)/4+j\pi(n-1)/4\} \quad (2)$$

For example, in the beam formation device with the beam number m=1, the beam weight w(m,n) to be multiplied by the signal from the antenna element with the antenna element number n=1 can be obtained by substituting "1" into m and n of equation (2).

When the correlation value outputs from the antenna elements $101_1$ to $101_n$ are multiplied by the beam weights by the beam formation devices $104_1$ to $104_4$ of the searcher section 100 and then synthesized, the phase between the outputs from the antenna elements $101_1$ to $101_n$ is corrected. Each of the beam formation devices $104_1$ to $104_4$ of the searcher section 100 generates one beam in accordance with the I/Q output and outputs the generated beam to a corresponding one of the delay profile estimation sections $105_1$ to $105_4$.

Figure 3:
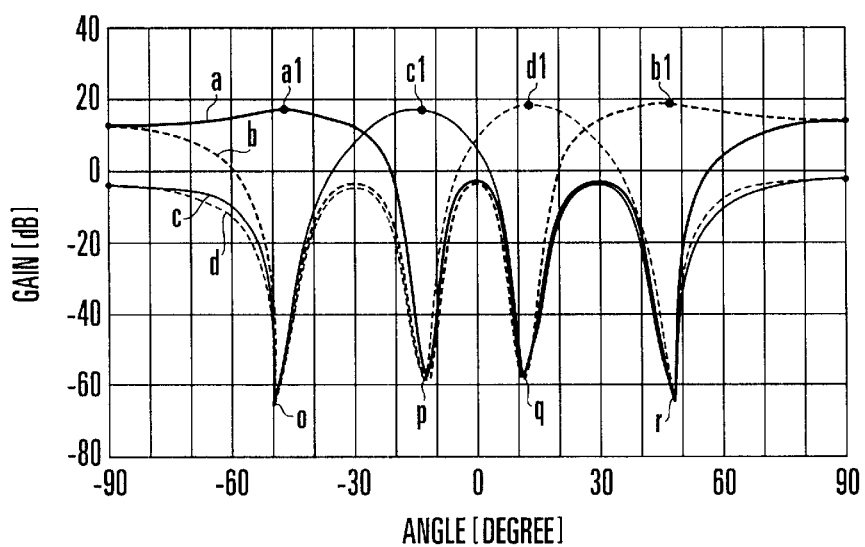
FIG. 3 is a graph showing the characteristics of beams received by the multi-beam receiving apparatus.
Figure 4:
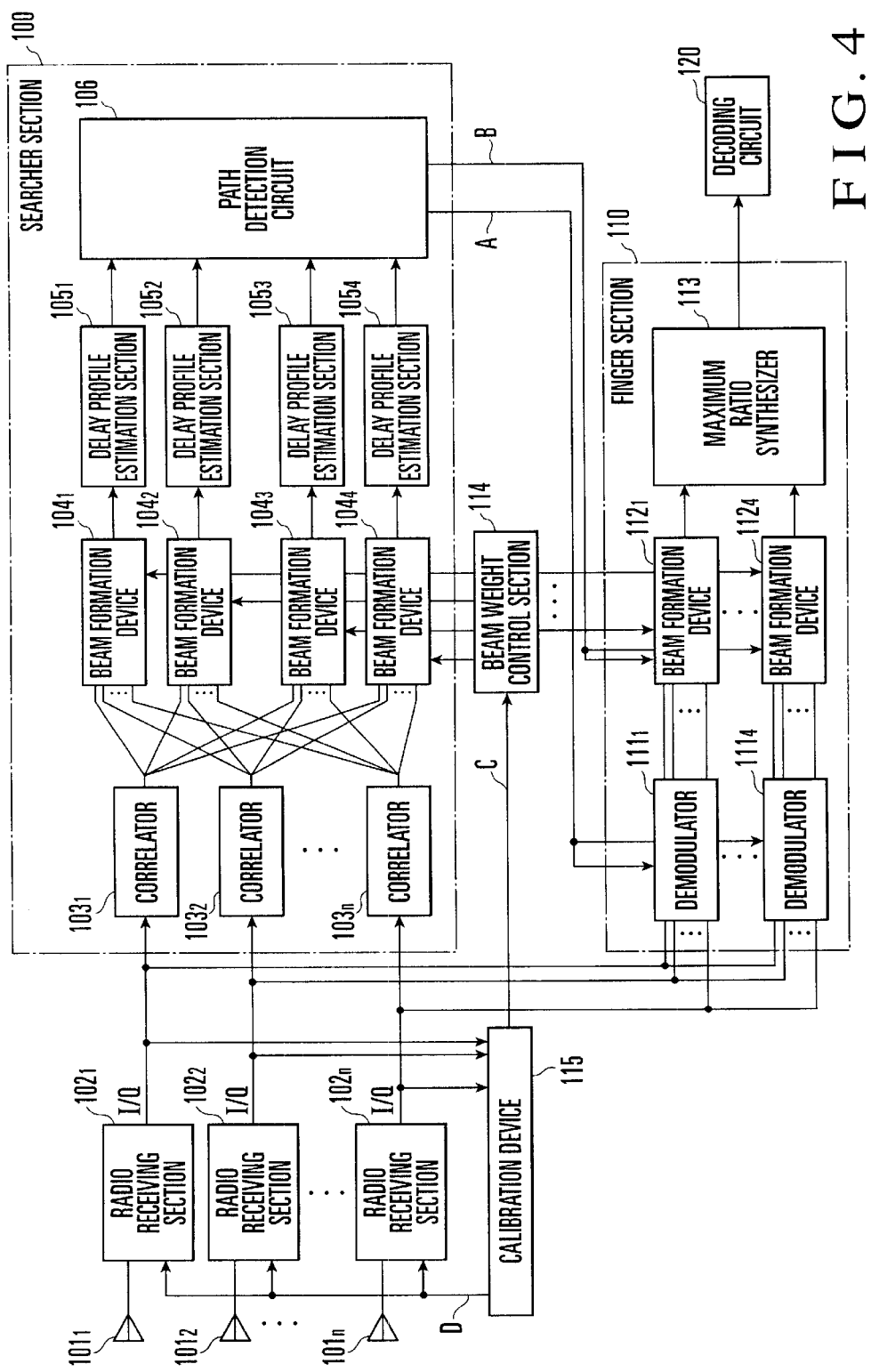
FIG. 4 is a block diagram of a multi-beam receiving apparatus according to the second embodiment of the present invention.

FIG. 3 shows the beam patterns of four beams individually output from the beam formation devices $104_1$ to $104_4$ of the searcher section 100. Referring to FIG. 4, beams a to d are output from the beam formation devices $104_1$ to $104_4$.

On the basis of the beams a to d output from the beam formation devices $104_1$ to $104_4$ of the searcher section 100, the delay profile estimation sections $105_1$ to $105_4$ generate delay profiles and output the profiles to the path detection circuit 106. The path detection circuit 106 detects an effective path from the delay profiles of the respective beams and sends to the finger section 110 the reception timing notification signal A and beam number notification signal B, which represent the timing and beam number.

As described above, the finger section 110 has the plurality of demodulators $111_1$ to $111_4$, and one demodulator is assigned to one path (reception timing). One demodulator receives all the digital baseband signals from the antenna elements $101_1$ to $101_n$ and demodulates the digital baseband signals at the timing indicated by the reception timing notification signal A. The outputs from the demodulators $111_1$ to $111_4$ are output to the beam formation devices $112_1$ to $112_4$, multiplied by beam weights by the beam formation devices $112_1$ to $112_4$, and added and synthesized.

The beam formation devices $112_1$ to $112_4$ of the finger section 110 have the same arrangement as that of the beam formation devices $104_1$ to $104_4$ of the searcher section 100 shown in FIG. 2. As a beam weight to be multiplied, a value calculated using equation (1) in accordance with the beam number of the path notified by the path detection circuit 106 is obtained from the beam weight control section 114. The signals obtained by addition and synthesis by the beam formation devices $112_1$ to $112_4$ are sent to the maximum ratio synthesizer 113. The maximum ratio synthesizer 113 weights the output signals from the beam formation devices $112_1$ to $112_4$ on the basis of a preset degree of confidence. The weighted output signals are synthesized and output to the decoding circuit 120.

Figure 5:
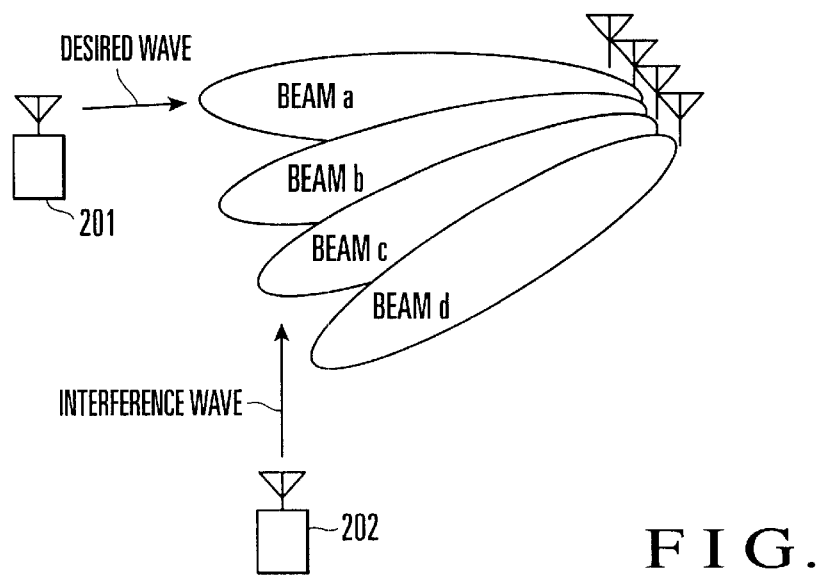
FIG. 5 is a view showing the beam reception situation in the multi-beam receiving apparatus.
Figure 6:
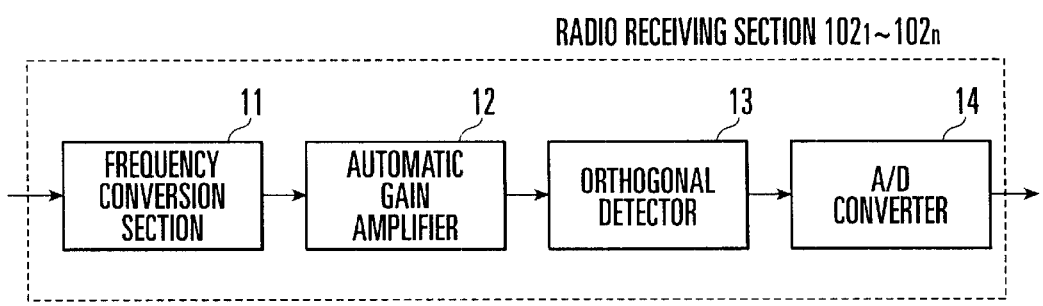
FIG. 6 is a block diagram of a radio receiving section shown in FIG. 1.

As described above, in this embodiment, the conventional sector is divided into the plurality of beams a, b, c, and d as shown in FIG. 5, and the respective beams are weighted such that the peak position of a certain beam has the null points of the remaining beams, as shown in FIG. 3. That is, referring to FIG. 3, null points o of the beams b, c, and d are located at a peak position a1 of the beam a, null points r of the beams a, c, and d are located at a peak position b1 of the beam b, null points p of the beams a, b, and d are located at a peak position c1 of the beam c, and null points q of the beams a, b, and c are located at a peak position d1 of the beam d.

Even in a single sector, when a signal of another beam is received, interference from another user can be eliminated. In addition, when a signal is transmitted in the direction of a beam of the maximum reception level, interference in transmission from the base station to the mobile station can also be reduced. When such a multi-beam receiving apparatus is used in the mobile communication system, the conventional problems in the multiple sectors can be solved, and a system with a higher quality and larger capacity than those of the conventional system can be implemented.

In the multi-beam system, the beams need not be adaptively controlled. Hence, the beam weight set by the beam weight control section 114 is originally a constant. However, in the system using an array antenna, generally, the variation amounts containing phase variations and amplitude variations in the respective radio receiving sections individually differ due to the element delay characteristic and amplitude characteristic of the amplifier and filter as the components of the radio receiving section or change due to a variation in temperature or degradation over time. For this reason, when the beam weight calculated from equation (1) is merely used as a constant, the beam pattern generated by the beam formation device may be different from the expected beam pattern.

Hence, a demand has arisen for output of a desired beam pattern even when the variation amount of the radio receiving section connected to each antenna element varies.

FIG. 4 shows a multi-beam receiving apparatus according to the second embodiment of the present invention. In the second embodiment, a calibration device 115 for sending to radio receiving sections $102_1$ to $102_n$ a calibration signal substantially in the same frequency band as that of a spread signal used for spectrum spread communication is added to the first embodiment shown in FIG. 1.

As shown in FIG. 4, the calibration device 115 transmits a calibration signal D to all the radio receiving sections $102_1$ to $102_n$, extracts the outputs from the radio receiving sections $102_1$ to $102_n$, and compares the outputs. The calibration device 115 calculates a calibration coefficient C for each of antenna elements $101_1$ to $101_n$ in accordance with the comparison result and notifies a beam weight control section 114 of the calculated calibration coefficient C at a predetermined period (calibration cycle).

The beam weight control section 114 multiplies a complex weight calculated by equation (1) by the calibration coefficient C received from the calibration device 115 to update the beam weight. The calibration coefficient is a correction value for correcting the variation in variation amount of the radio receiving sections $102_1$ to $102_n$ corresponding to the antenna elements $101_1$ to $101_n$ and a complex value containing phase information and amplitude information.

As described above, in the second embodiment, the beam weights are updated every calibration cycle using the calibration coefficient C that is calculated by the calibration device 115 for the radio receiving sections $102_1$ to $102_n$. Consequently, the variation between the radio receiving sections $102_1$ to $102_n$ is compensated simultaneously with beam formation, so a desired beam can be accurately output.

As has been described above, according to the present invention, one sector of a cell can be divided into a plurality of beams and communicated. In addition, interference from another user with the communication signal of each beam can be reduced. As a result, when the multi-beam receiving apparatus of the present invention is applied to the base station of a mobile communication system, interference from another mobile station can be eliminated without dividing a cell into a larger number of sectors, and any increase in the number of times of hand-over between the sectors can be suppressed. Hence, a system having a higher quality and larger capacity can be implemented without decreasing the radio channel capacity or increasing the scale and cost.

In addition, the beam weight is updated on the basis of a calibration coefficient calculated at a predetermined period. For this reason, even when the variation amount of each radio receiving section varies, the variation can be compensated, and a desired beam can be accurately formed.

What is claimed is:

1. A multi-beam receiving apparatus comprising:
   a plurality of antenna elements;
   a plurality of radio receiving means for receiving radio signals through said antenna elements, respectively;
   a plurality of correlation means for calculating code correlation values of desired wave signals contained in reception signals output from said radio receiving means;
   a plurality of first beam formation means for individually forming beams on the basis of all outputs from said correlation means;

a plurality of delay profile means for individually generating delay profiles on the basis of outputs from said first beam formation means;

detection means for detecting, on the basis of outputs from said delay profile means, a reception timing of a multipath formed from the beams formed by said first beam formation means;

a plurality of demodulation means for demodulating all the reception signals output from said radio receiving means at the reception timing detected by said detection means;

a plurality of second beam formation means for individually forming beams on the basis of all demodulation outputs from said demodulation means;

synthesis means for synthesizing outputs from said second beam formation means after weighting; and beam weight control means for weighting, by a beam weight, each output from said correlation means for each of said first beam formation means and weighting, by a beam weight, each output from said demodulation means for each of said second beam formation means.

2. An apparatus according to claim 1, wherein said beam weight control means performs weighting by a beam weight preset for each output from said correlation means and demodulation means.

3. An apparatus according to claim 1, wherein said apparatus further comprises calibration means for calculating, at a predetermined period, a calibration coefficient used to correct a variation in variation amount including a phase and amplitude of the reception output from said radio receiving means and notifying said beam weight control means of the calibration coefficient, and said beam weight control means sets the beam weight to be given to each output from said correlation means and demodulation means on the basis of the notified calibration coefficient.

4. An apparatus according to claim 1, wherein said first beam formation means multiplies the code correlation value of each desired wave signal calculated for each of said correlation means by a corresponding beam weight set by said beam weight control means, and adding and synthesizing products to form the beam, and said second beam formation means multiplies a demodulation value of the reception signal for each radio receiving means, which is output from said demodulation means, by a corresponding beam weight set by said beam weight control means, and adding and synthesizing products to form the beam.

5. An apparatus according to claim 1, wherein each of said radio receiving means comprises a frequency conversion section for frequency-converting a CDMA reception signal through a corresponding one of said antenna elements into an intermediate frequency, a quadrature detector for detecting the intermediate frequency signal output from said frequency conversion section to a baseband signal of I/Q channels by quadrature detection, and an A/D converter for converting an I/Q output from said quadrature detector into a digital signal.

6. An apparatus according to claim 5, wherein each of said first beam formation means comprises a pair of first multipliers each for multiplying the I/Q code correlation value of each desired wave signal calculated for each of said correlation means by a first beam weight, a pair of second multipliers each for multiplying the I/Q code correlation value by a second beam weight, a pair of adders for adding I/Q outputs from said second multipliers to I/Q outputs from said first multipliers, and a pair of accumulators for adding and synthesizing I/Q outputs from said adders for each of said antenna elements.

7. An apparatus according to claim 5, wherein each of said second beam formation means comprises a pair of first multipliers each for multiplying the I/Q demodulation value of the reception signal for each radio receiving means, which is output from said demodulation means, by a first beam weight, a pair of second multipliers each for multiplying the I/Q demodulation value by a second beam weight, a pair of adders for adding I/Q outputs from said second multipliers to I/Q outputs from said first multipliers, and a pair of accumulators for adding and synthesizing I/Q outputs from said adders for each of said antenna elements.

8. An apparatus according to claim 1, wherein said radio receiving means and correlation means are provided in number equal to that of antenna elements, and said first and second beam formation means, delay profile generation means, and demodulation means are provided in number equal to that of beams to be formed.

9. A multi-beam receiving apparatus comprising:

a plurality of antenna elements;

a plurality of radio receiving sections for converting reception signals through said antenna elements into digital baseband signals of I/Q channels;

a searcher section, wherein said search section receives output from said radio receiving sections, wherein a correlation is calculated for each of said output, wherein each correlation is multiplied by predetermined beam weights to form a plurality of beams, and wherein a timing of a path for each beam is detected based on a delay profile obtained from each of the formed beams;

a finger section for demodulating each output from said radio receiving sections at each timing detected by said searcher section, and synthesizing results obtained by multiplying demodulated signals by predetermined beam weights; and a beam weight control section for setting the predetermined beam weights for said searcher section and finger section.

10. An apparatus according to claim 9, wherein said searcher section comprises a plurality of first beam formation devices for individually forming the beams on the basis of results obtained by multiplying each correlation by the predetermined beam weights, and said finger section comprises a plurality of second beam formation devices for forming the beams on the basis of results obtained by multiplying all demodulation outputs from said demodulation means by the predetermined beam weights.

* * * * *